United States Patent [19]
Contreras et al.

[11] Patent Number: 5,774,291
[45] Date of Patent: Jun. 30, 1998

[54] VOLTAGE MEASUREMENT CIRCUIT FOR A MAGNETORESISTIVE HEAD INSTALLED IN A DISK ENCLOSURE

[75] Inventors: John Thomas Contreras, San Jose; Glen Alan Garfunkel, Palo Alto; Calvin Shizuo Nomura, San Jose, all of Calif.

[73] Assignee: International Business Machines Corporation, Armonk, N.Y.

[21] Appl. No.: 623,449

[22] Filed: Mar. 28, 1996

[51] Int. Cl.⁶ .................................. G11B 5/03; G11B 5/09
[52] U.S. Cl. .................................. 360/67; 360/66; 360/61
[58] Field of Search .................................. 360/66, 67, 68, 360/46

[56] References Cited

U.S. PATENT DOCUMENTS

| | | | |
|---|---|---|---|
| 4,706,138 | 11/1987 | Jove et al. | 360/67 |
| 4,786,993 | 11/1988 | Jove et al. | 360/67 |
| 4,802,033 | 1/1989 | Chi | 360/77.04 |
| 4,807,074 | 2/1989 | Kamo | 360/113 |
| 5,032,935 | 7/1991 | Jove et al. | 360/67 |
| 5,057,785 | 10/1991 | Chung et al. | 328/162 |
| 5,132,852 | 7/1992 | Price, Jr. | 360/68 X |
| 5,204,789 | 4/1993 | Jove et al. | 360/67 |
| 5,270,882 | 12/1993 | Jove et al. | 360/67 |
| 5,283,521 | 2/1994 | Ottesen et al. | 324/225 |
| 5,301,080 | 4/1994 | Ottesen et al. | 360/113 |
| 5,309,294 | 5/1994 | Cahalan | 360/66 |
| 5,323,278 | 6/1994 | Contreras et al. | 360/67 |
| 5,327,303 | 7/1994 | Smith | 360/67 |
| 5,412,518 | 5/1995 | Christner et al. | 360/66 |
| 5,442,492 | 8/1995 | Cunningham et al. | 360/46 |
| 5,444,579 | 8/1995 | Klein et al. | 360/67 |
| 5,465,186 | 11/1995 | Bajorek et al. | 360/113 |

Primary Examiner—Aristotelis M. Psitos
Assistant Examiner—Kin Wong
Attorney, Agent, or Firm—Baker Maxham Jester & Meador

[57] ABSTRACT

A circuit forming part of an arm electronics module installed on an actuator arm that measures the voltage across an MR head A control unit supplies a measurement enable signal that enables a measurement enable circuit. A current bias circuit, responsive to the control unit, supplies a bias current to the MR head. A common node in the circuit provides a voltage signal responsive to the voltage across the MR head, with an added diode $V_{BE}$ drop across an input transistor. A voltage measurement amplifier has an input node and an output node that supplies an output voltage reduced in voltage by one diode drop ($V_{BE}$). An input switch, responsive to the measurement enable signal is coupled between the input node and the common node. An output switch, responsive to the measurement enable signal is coupled between the output node and an output terminal. The output terminal is connected to a connector pin in an electrical connector via a flex cable to provide a convenient point for test and calibration apparatus to sample the MR head voltage. The circuit advantageously allows the MR head's voltage to be measured during assembly of and after merging into a disk enclosure, providing essential information for optimizing each MR head's operating point. Furthermore, an electrical short circuit may be provided across the MR head during the manufacturing process to prevent damage to the MR head due to electro-static discharge (ESD). The short can be left in place until merging into the disk enclosure and then, after merging, the voltage measurement circuit can be utilized to measure the voltage of the head with the short removed. Furthermore, the voltage measurement circuit can be enabled some time after normal operation of the disk drive begins, for purposes such as reoptimizing the bias currents through the MR heads or for failure analysis.

37 Claims, 5 Drawing Sheets

VOLTAGE MEASUREMENT CIRCUIT FOR A MAGNETORESISTIVE HEAD INSTALLED IN A DISK ENCLOSURE

BACKGROUND OF THE INVENTION

1. Field of the Invention

The present invention relates to magnetic recording systems, and particularly to magnetic data storage systems that have magnetoresistive heads.

2. Description of the Related Art

Manufacturers today go to great lengths to ensure that their products are of high quality, and that their operational characteristics are optimized. One group of products for which quality and reliability are of utmost importance are disk drives, which are widely utilized within computers and other devices for data storage. A disk drive, which is a type of magnetic recording device, can store vast amounts of data that can be quickly accessed.

One component of a disk drive is a magnetic transducer, referred to as a head, which is an electromagnetic device that is closely positioned to the disk to read and write data. High capacity disk drive units, which are common today, have multiple disks and multiple heads to read and write data. One type of high performance recording head is a magnetoresistive (MR) head. In order to optimize the MR head's operating point for optimum performance, it is important to first know the resistance across the MR head. One approach has been to assume a resistance value based upon statistical data, but manufacturing variations and the high sensitivity of the system to resistance variations can cause problems with this approach. Therefore, it is useful to measure the resistance of each head in a disk drive using a system such as disclosed by Christner et al. in U.S. Pat. No. 5,412,518, which is assigned to the assignee herein. The '518 patent discloses a method and apparatus for controlling the biasing current applied to MR heads within a magnetic disk drive to provide optimized bias current for each head/disk/channel component combination. At the time of manufacture, an optimized bias current for each head is ascertained and stored on the disk surface. During each subsequent power up operation the stored values are transferred to random access memory which is accessed during execution of each head switch command to apply a bias current in accordance with the optimized value to the active MR head.

One problem with Christner's approach is that the MR resistance measurement must be accomplished at the subassembly level, before the unit is installed in the disk enclosure. For example, the resistance measurement must be completed at the MR head wafer level, the slider assembly level, or by inconvenient probing methods at the Head-Stack-Assembly (HSA) level (after the actuator has been assembled and just before it is merged into the disk enclosure). After the MR head, actuator and the like are merged together within the disk enclosure, the terminals of the MR head are not available for measurement without removing the unit from its enclosure, and it is impractical to extend the terminals beyond the disk enclosure because such extension can severely degrade the disk unit's file performance. Furthermore, Christner's MR resistance measurements are time-consuming and require special probes and fixtures to gain access to the MR resistance node.

For manufacturing purposes, it would be useful to protect the magnetoresistive recording heads against electro-static discharge (ESD) with a shorting mechanism such as a solder-ball. In order to maximize ESD protection, the solderball should not be removed until the latest possible moment, which is just before the head is merged into the disk enclosure. However, using conventional techniques the MR resistance cannot be read until the short circuit has been removed, and measuring the resistance can be difficult once the disk drive has been installed into the disk enclosure.

SUMMARY OF THE INVENTION

The magnetoresistive (MR) voltage measurement circuit described herein advantageously allows MR resistance and low frequency voltage measurements to be made through an HSA (Head Stack Assembly) connector. This enables testing at the HSA level (after the HSA has been assembled) and at all subsequent assembly levels, including post-merge and file level. Measuring the MR head's dc and low frequency electrical and magnetic properties at and beyond HSA is very beneficial for controlling yields, file performance, and manufacturing process issues. Magnetic low frequency measurements include the quasistatic transfer curve amplitude and asymmetry, among others. Furthermore, the MR head measurement circuit can be used to monitor the MR head resistance within the disk enclosure for purposes such as evaluation and failure analysis even after extended periods of operation. This in-situ measurement feature saves time and cost, and avoids the possibility of damage that would otherwise be incurred if removal of the MR head was required for this measurement. Additionally, the MR voltage measurement circuit has isolation features so that when not selected it does not load the normal function of the input/output port to which it is connected. Also, the MR resistance circuit provides MR head resistance measurements more accurate than with previous methods. Specifically, the resistance measurement can provide a tolerance less than 4%. The circuit band width extends from dc to 100 KHZ, which is appropriate for quasistatic magnetic measurements which are most conveniently implemented over the range from a few Hertz to around 100 KHZ. Embodiments extending to higher frequencies are possible. The term "quasistatic" here refers to the magnetic response of the MR head to spatially uniform, slowly varying magnetic fields.

A circuit for measuring the voltage of an MR recording head is part of an Arm Electronics (AE) module installed on, or in close proximity to, an actuator arm within a disk drive enclosure of a disk drive unit. The circuit comprises a control unit that supplies a measurement enable signal. The circuit also comprises a measurement circuit that includes a current bias circuit responsive to the control unit to supply bias current to the MR recording head. The measurement circuit includes a common node, coupled to the current bias circuit, that provides a voltage signal responsive to the voltage across the MR head. The measurement circuit also includes an amplifier having an input and an output node. An input switch, responsive to the measurement enable signal, is coupled between the input node and the common node. An output switch, also responsive to the measurement enable signal, is coupled between the output node and an output terminal. The output terminal is connected to a pin on the AE module flex cable connector to provide convenient access to the MR head voltage signal for use by external test and calibration equipment.

Advantageously, the MR voltage measurement circuit allows the manufacturing process to effectively use a short circuit for electrostatic discharge (ESD) protection during critical stages of manufacturing before the MR head is merged into the disk enclosure. Utilization of a short circuit across the MR head increases yield of the manufacturing process, enhances head reliability, and saves costs.

In some embodiments, a single MR voltage measurement circuit can have a mode select feature that modifies the amplifier to accommodate different bias currents during manufacture. The mode select feature is useful if two or more types of MR heads, each having a different resistance, are to be measured by the same circuit implementation, which enables identical electronic modules to be utilized in different models even if the MR head types are different.

The foregoing, together with other objects, features and advantages of this invention, will become more apparent when referring to the following specification, claims and the accompanying drawings.

BRIEF DESCRIPTION OF THE DRAWINGS

For a more complete understanding of this invention, reference is now made to the following detailed description of the embodiments as illustrated in the accompanying drawings, wherein.

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Disk Drive System

Figure 1:
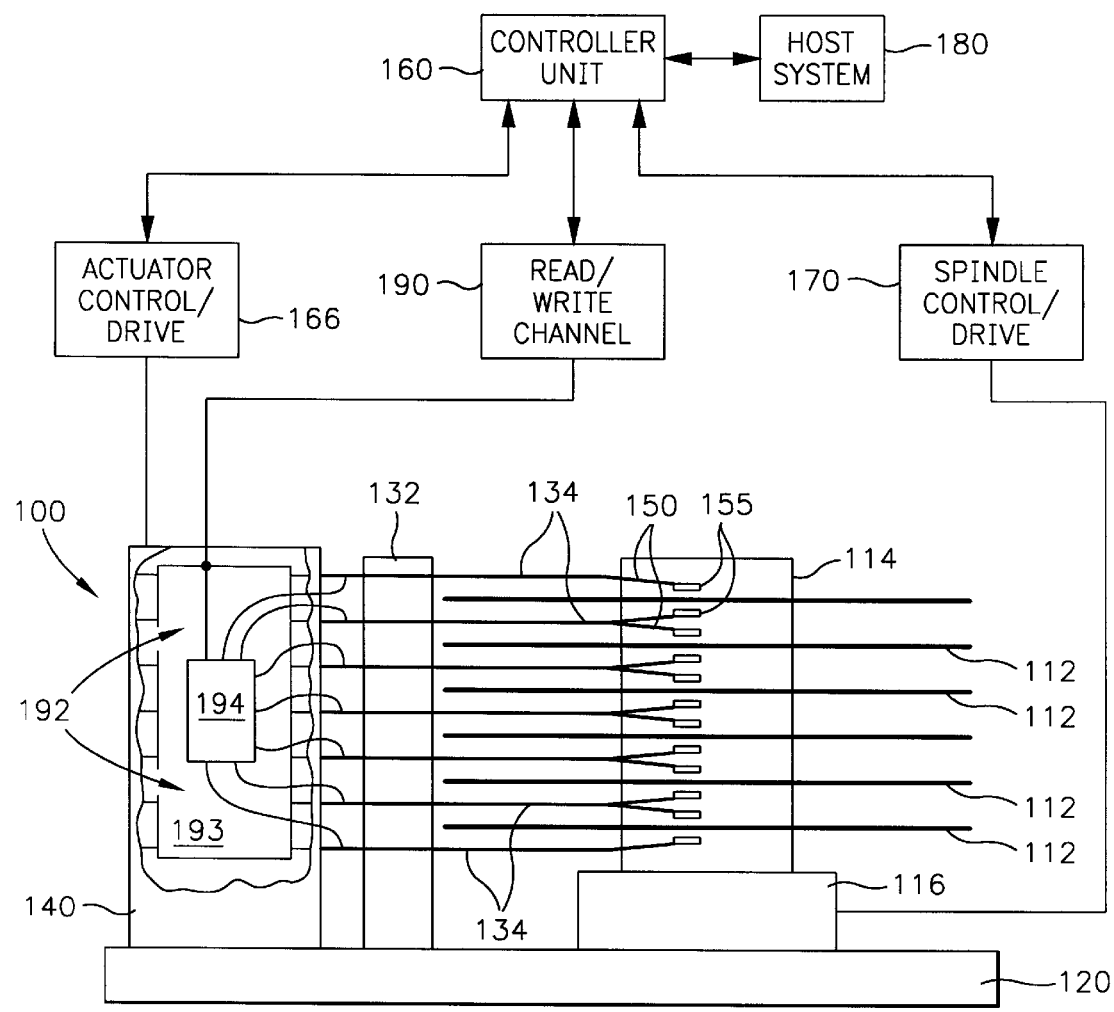
FIG. 1 is a side view of a disk drive system and a controller unit in block form.
Figure 2:
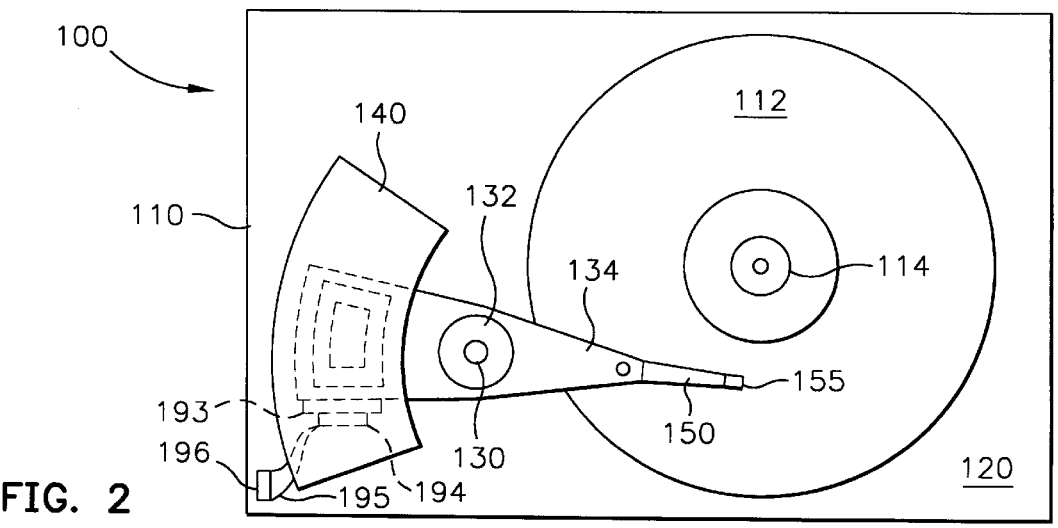
FIG. 2 is a top view of a disk drive system.

FIGS. 1 and 2 show a side and a top view, respectively, of a disk drive system designated by the general reference number 100, within a disk drive enclosure 110. The disk drive system 100 comprises a plurality of stacked magnetic recording disks 112 mounted to a spindle 114. The disks 112 may be conventional particulate or thin film recording disks or, in other embodiments, they may be recently proposed liquid bearing disks. The spindle 114 is attached to a spindle motor 116 which rotates the spindle 114 and disks 112. A chassis 120, connected to the enclosure 110, provides stable mechanical support for the disk drive system. The spindle motor 116 and an actuator shaft 130 are attached to the chassis 120. A hub assembly 132 rotates about the actuator shaft 130 and supports a plurality of actuator arms 134. The stack of actuator arms 134 is sometimes referred to as a "comb". A rotary voice coil motor 140 is attached to chassis 120 and to a rear portion of the actuator arms 134.

A plurality of head suspension assemblies 150 are attached to the actuator arms 134. A plurality of transducer heads 155 are attached respectively to the suspension assemblies 150, each head 155 including at least one magnetoresistive (MR) element for reading data from a magnetic disk. The head 155 may also include an inductive write element. The heads 155 are positioned proximate to the disks 112 by the suspension assemblies 150 so that, during operation, the MR heads therein are in electromagnetic communication with the disks 112. The rotary voice coil motor 140 rotates actuator arms 134 about the actuator shaft 130 in order to move the head suspension assemblies 150 to the desired radial position on disks 112.

A controller unit 160 provides overall control to the disk drive system 100, including rotation control of the disks 112 and position control of the MR head blocks 155. The controller unit 160 typically includes (not shown) a central processing unit (CPU), a memory unit and other digital circuitry, although it should be apparent that these aspects could also be enabled as hardware logic by one skilled in the computer arts. Controller unit 160 is connected to an actuator control/drive unit 166 which in turn is connected to the rotary voice coil motor 140. A host system 180, typically a computer system, is connected to the controller unit 160. The host system 180 may send digital data to the controller unit to be stored on the disks, or it may request that digital data at a specified location be read from the disks and sent back to the host system. The basic operation of DASD (Direct Access Storage Device) units is well known in the art and is described in more detail in *The Magnetic Recording Handbook*, C. Dennis Mee and Eric D. Daniel, McGraw-Hill Book Company, 1990.

A read/write channel 190 is coupled to receive read and write signals generated by the controller unit 160, and communicate them to an arm electronics (AE) unit shown generally at 192 through a cut-away portion of the voice coil 140. The AE unit 192 includes a printed circuit board 193 or a flexible circuit mounted on, or in close proximity to, the ends of the actuator arms 134, and an AE module 194 mounted on the printed circuit board (or flexible circuit) that comprises circuitry preferably implemented in an integrated circuit (IC) chip, including read drivers, write drivers, and associated control circuitry. The AE module 194 is coupled via connections in the printed circuit board to the read/write channel 190 and also to each read head and each write head in the plurality of head blocks 152. The flexible circuit, which is an alternative to the printed circuit board, may include wire leads embedded in.a flexible material such as Mylar. The flexible circuit may be affixed loosely to the adtuator arm or a structure in close proximity thereto, or may even be unaffixed thereto. The AE unit 192 including the circuit board 193 and AE module 194 is connected via a flexible electrical cable 195 to a terminal in a flex cable connector 196, which provides a convenient single connection point to the other file circuitry.

Figure 3:
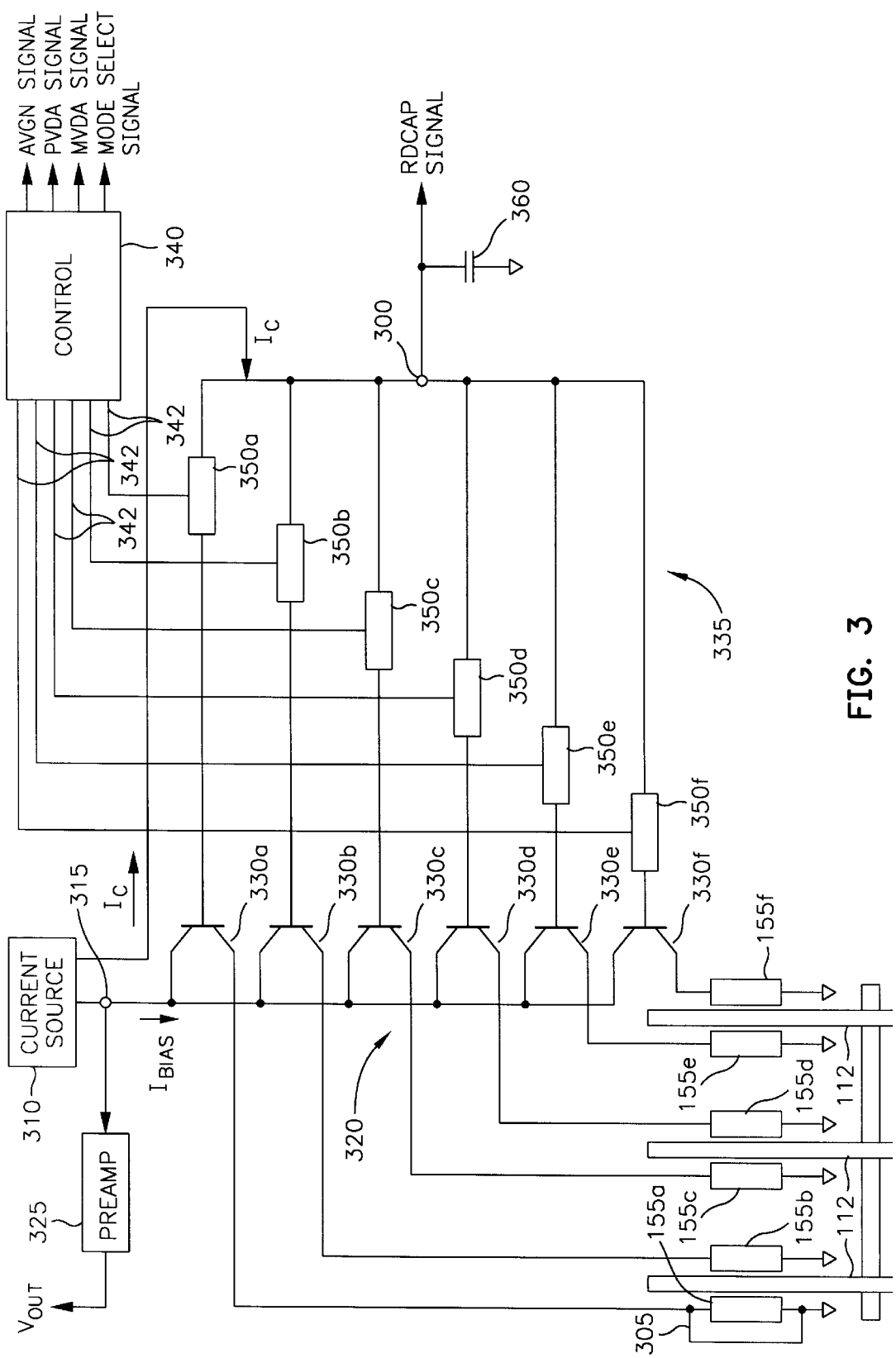
FIG. 3 is a schematic and block diagram of an illustrative embodiment of a multiple configuration of a read circuit that has a common node through which a voltage output is supplied to the voltage measurement circuit described herein.

FIG. 3 is a circuit diagram of an illustrative embodiment of a multiple head configuration of a read circuit that has a common node 300, through which the RDCAP signal is supplied to the voltage measurement circuit. The RDCAP signal is a voltage signal that includes the sum of the voltage ($V_{MR}$) across the MR recording head and the voltage resulting from the diode drop across the input device:

$$V_{RDCAP} = V_{MR} + V_{BE} \qquad \text{Eq.1}$$

An electrical short, such as for example a solder ball, shown schematically at 305 on only one head for convenience of description, is used to short each of the MR heads 155 during manufacture and prevent potential damage due to ESD (electro-static discharge). Particularly, the short 305 is applied at an early stage to each MR head in the assembly, such as when it is attached to the suspension. The short is left on as long as possible, such as just before merging into the enclosure, and then removed to allow normal operation of the MR head. An example in which MR heads are shorted during manufacture is disclosed in a commonly-assigned patent, U.S. Pat. No. 5,465,186, issued Nov.7, 1995 to Bajorek et al. which is expressly incorporated by reference herein.

A current source 310 provides a bias current $I_{BIAS}$ through a node 315 to a plurality of input devices illustrated generally at 320. Particularly, the input devices include a plurality of bipolar junction transistors (BJTs) 330 connected to the node 315 so that their collectors are coupled to receive the bias current. A conventional preamp 325 is also coupled to the node 315. Each of the plurality of BJTs 330 is coupled, respectively, to an MR head 155. Particularly, a first BJT 330a is coupled to a first MR head 155a, a second BJT 330b is coupled to a second MR head 155b, and similarly the BJTs 330c–f are respectively coupled to the MR head 155c–f.

In addition to $I_{BIAS}$ the current source 300 also supplies a control current $I_c$ to the base of each of the BJTs 330a–f via the common node 300 and a switching network illustrated generally at 335. A control circuit 340 is provided that, in addition to other functions, supplies a select signal to select only one of the BJTs at any particular time, utilizing head select lines 342. Particularly, the control circuit 340 selects only one of a plurality of switches 350 that are coupled between the common node 300 and the BJT 330a–f. Particularly, a first switch 350a is coupled between the common node 300 and the base of the first BJT 330a, a second switch 350b is coupled between the common node 300 and the base of the second BJT 330b, and each of the remaining switches 350c–f are respectively coupled to the bases of the BJTs 330c–f. Additionally, a capacitor 360 is coupled between ground and the common node 300.

The control unit herein supplies control signals including an AVGN signal, a PVDA signal, and an MVDA signal that collectively comprise a measurement enable signal for the embodiment described herein.

Figure 4:
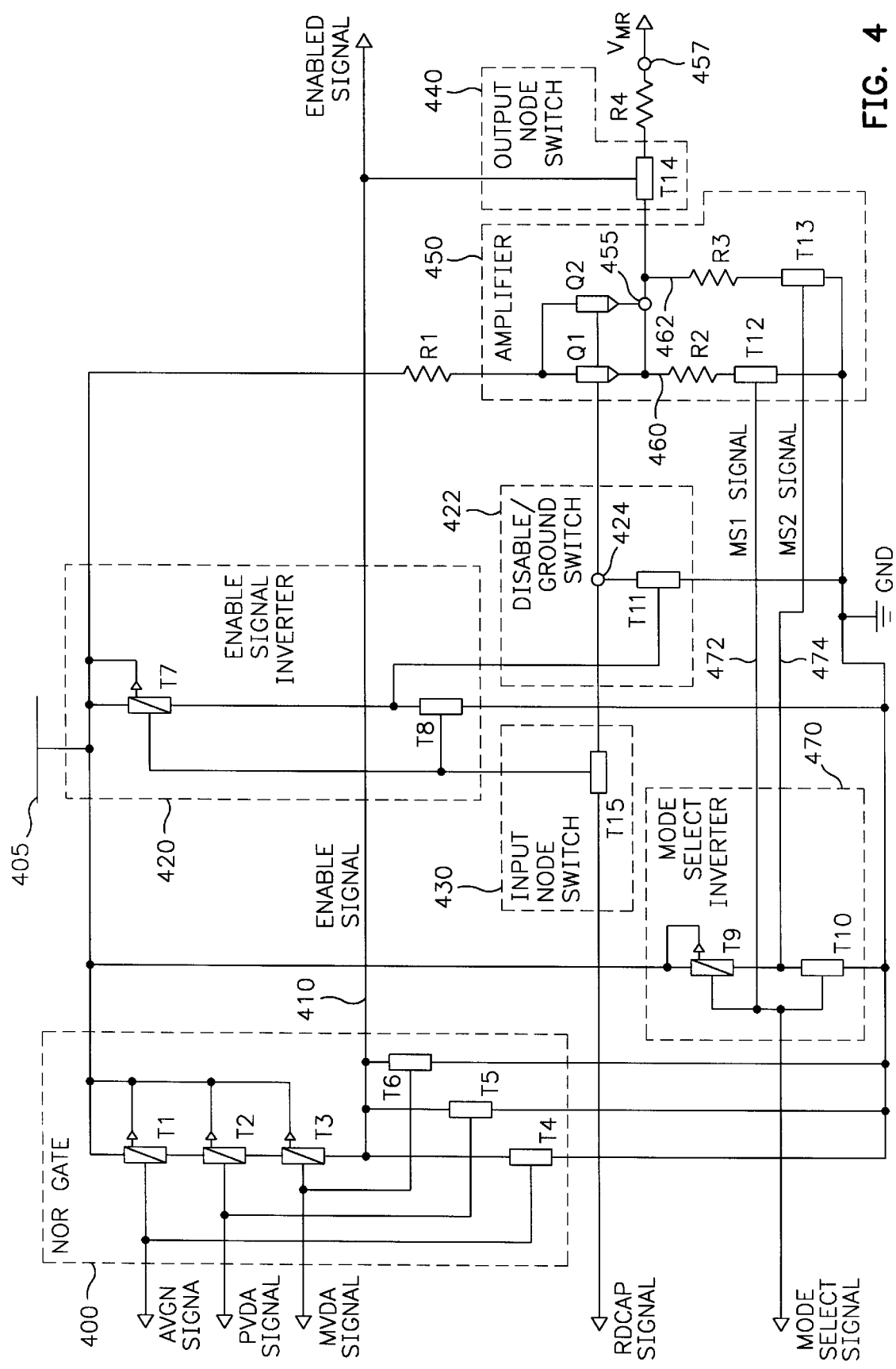
FIG. 4 is a circuit diagram of the voltage measurement circuit of the preferred embodiment.

Reference is now made to FIG. 4 which is a circuit diagram of the voltage measurement circuit of the preferred embodiment that receives the RDCAP signal from the common node 300 and control signals from the control unit 340 shown in FIG. 3. The measurement signals (AVGN, PVDA, and MVDA) are supplied from the control unit to a 3-input NOR gate 400 that comprises a plurality of PFETs and NFETs in a conventional configuration coupled between a voltage supply 405 and ground. The NOR gate provides a single measurement enable signal output on a line 410 to an inverter 420, an input node switch 430, and an output node switch 440.

The inverter 420 includes a conventional inverter configuration including a PFET T7 and an NFET T8 in series whose output, taken from between the two devices, is supplied to a disable/ground switch 422 that is coupled between a node 424 at the input of the amplifier 450 and ground. When the measurement enable signal is asserted HIGH on the line 410, the enable signal inverter 420 inverts the HIGH signal and supplies a LOW state to the disable/ground switch 422, which turns off the switch 422 and thereby isolates the amplifier input node 424 from ground. Subsequently, when the enable signal is reversed (deasserted), then the enable signal inverter 420 would provide a high output that connects the node 424 to ground.

The measurement enable signal on the line 410 is also supplied to the input node switch 420, which preferably comprises an NFET T15 coupled between the RDCAP signal and the input node 424 to an amplifier 450. When the measurement enable signal is asserted, the RDCAP signal is connected to the amplifier 450.

The measurement enable signal on the line 410 is also supplied to the output node switch 440, which preferably comprises an NFET T14 coupled between an output node 455 of the amplifier 450 and an output terminal 457. A resistor $R_0$ is coupled between the output node switch 440 and the output node 455, in order to enhance stability and to limit current in the case of a short circuit. In an implemented embodiment, the resistor $R_0$ has a 300Ω value. The output of the node 455 is a voltage $V_{MR}$ at output terminal 457.

The amplifier 450 comprises a pair of coupled bipolar junction transistors (BJTs) including a first BJT Q1 and a second BJT Q2. The bases of the transistors Q1 and Q2 are coupled together to receive the RDCAP signal via the input node switch 430 and the input node 424. The collectors of the transistors Q1 and Q2 are coupled, via a resistor $R_1$, to the voltage supply 405. The resistor $R_1$ limits the maximum operating current for BJTs Q1 and Q2 if a short circuit were to be experienced at the output terminal 457. In an implemented embodiment resistor $R_1$ has a value of 300Ω. The emitters of the transistors Q1 and Q2 are coupled to the output node 455. Thus, between the coupled bases of the transistors Q1 and Q2, and the output node 455, the RDCAP signal experiences a voltage drop equivalent to one diode, which is equal to about 0.7 volts. This voltage drop ($V_{BE}$) compensates for a similar (but opposite) voltage drop across the input transistor 330 (FIG. 3). Thus, this compensation provides an accurate measurement of the voltage ($V_{MR}$) across the MR head. Furthermore, because in the preferred embodiment the input transistors 330 and the transistors Q1 and Q2 are implemented on the same chip, $V_{BE}$ in Q1 and Q2 is almost identical to $V_{BE}$ in the BJT 330, thus ensuring highly accurate compensation.

In other embodiments, if the input signal to the measurement circuit did not have the voltage drop from an input transistor, then a unity gain amplifier, such as a conventional buffer, could be utilized in its place.

Between the output node 455 and ground, one of two arms provides a current bias. Particularly, a first arm 460 includes a resistor $R_2$ and a first mode switch, preferably an NFET T12 coupled between the resistor and ground. The second arm includes a resistor $R_3$ and a second mode switch, preferably an NFET T13 coupled between the resistor $R_3$ and ground. The value of each of the resistors $R_2$ and $R_3$ are chosen to provide a current bias through the amplifier 450 that matches the bias current supplied by the current bias source 310 (FIG. 3). In an implemented embodiment, the resistor $R_2$ is 150Ω and the resistor $R_3$ is 350Ω. The control unit 340 provides a mode select signal (FIG. 3) which is supplied to a conventional mode select inverter 470 coupled between the voltage supply 405 and ground. Dependent upon the logic level of the mode select signal, either the output line 472 will supply the MS1 signal to the NFET T12, or the line 474 will supply the MS2 signal to switch the NFET T13. The mode switches T12 and T13 are useful for selecting either the first arm 460 or the second arm 462, so that operation in one of two modes can be provided. If, in other preferred embodiments, dual mode operation is not required, then both the switches T12 and T13 can be eliminated, as well as one of the resistors, so that only a single resistor would be provided between the output node 455 and ground.

The voltage measurement circuit illustrated in FIG. 4 is implemented in close proximity to the MR head. In the preferred implementation, the AE module 194, which is affixed to the actuator arm (FIG. 1) includes circuitry to implement the entire voltage measurement circuit shown in FIG. 4, and also, in FIG. 3, the current source 310, the preamp 325, the switching network 335, the BJT switches 320, the control unit 340, and the capacitor 360. The output terminal 457 is connected directly to one of the pins in flex cable connector 196 (as shown in FIG. 2) via flex cable 195 to provide convenient access by external test and calibration equipment.

Figure 5:
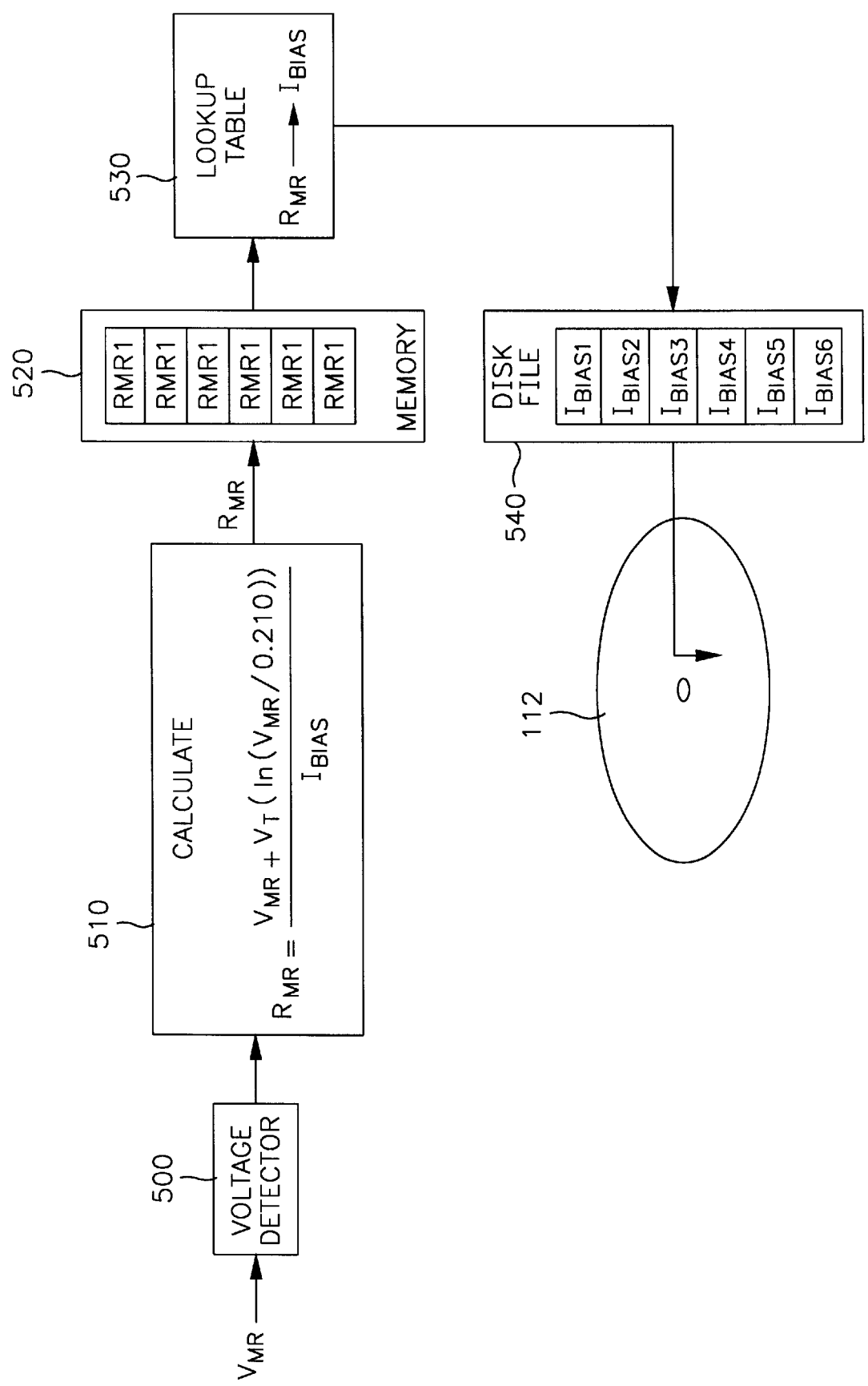
FIG. 5 is a block diagram of circuitry that performs operations to process the voltage $V_{MR}$ supplied from the output terminal, calculate a resistance, select an optimal bias current, and store the selected bias current on a disk.

Reference is now made to FIG. 5 which is a diagram that illustrates operations and circuitry to process the voltage $V_{MR}$ supplied from the output terminal 457 in FIG. 4. The voltage $V_{MR}$ which is indicative of the resistance of the MR head is supplied to a voltage detector 500 that outputs a digital value used as an input value to perform a calculation in the following box 510. Particularly, the MR head resistance is calculated according to the formula shown therein.

$$R_{MR} = \frac{V_{MR} + V_T * \ln(V_{MR}/0.21)}{I_{BIAS}} \quad \text{Eq. 2}$$

Where $V_{MR}$=Voltage Measured in Volts at output
$R_{MR}$=calculated Resistance Measured in ohms
$V_T$=Thermal Voltage (use 0.026V)

Because the resistive measurement step and calculation is performed for each of the MR heads 155 (FIG. 1) in the disk drive unit 100, a separate slot in memory is shown for each measured resistance.

The resistance $R_{MR}$ calculated in the box 510 is then stored in memory 520. The control circuit 340 can be used to determine which of the heads is connected and insert the resistance in the proper location in memory. Subsequently, each resistance value is applied to a lookup table 530 which maps predetermined optimum current bias values with the measured values. Typical values for a lookup table are set forth in U.S. Pat. No. 5,412,518, which is assigned to the same assignee, the specification of which is incorporated by reference herein. From the lookup table 530, an $I_{BIAS}$ value for each head is stored into a disk file 540. Preferably the disk file 540 including the optimum bias values is stored on the disks 112. In operation, the optimum current values are read during boot-up operations and applied by the control unit 340 during subsequent operations to provide the optimum bias current for each MR head as it is utilized to read data.

In an implementation preferred for cost reasons, the voltage detector block 500, the memory 520 for storing resistance values, and the lookup table 530 reside not on the AE module 194 but in the controller unit 160 or the host system 180. The calculations in the box 510 are performed by any suitable circuitry in the controller unit 160 or the host system 180. In some embodiments, if sufficient space were available, the circuitry implementing these blocks 500, 510, 520 and 530 could be implemented on-chip.

Preferably, the components 500, 510, 520 and 530 are part of test equipment connected to the flex cable connector 196 (FIG. 2) during manufacturing/assembly of the HSA and/or the file. In addition to determining the optimum bias currents, the MR head voltage $V_{MR}$ can be used to complete a series of tests such as discussed in the Summary of the Invention. To provide bias currents to perform theses tests, the test equipment may supply bias currents (either dc or low frequency) that supplant, for testing purposes, the bias current that would otherwise be supplied by the current source 110. For this purpose, terminals may be connected via the flexible cable 195 to appropriate nodes, such as nodes 315 and 300.

Figure 6:
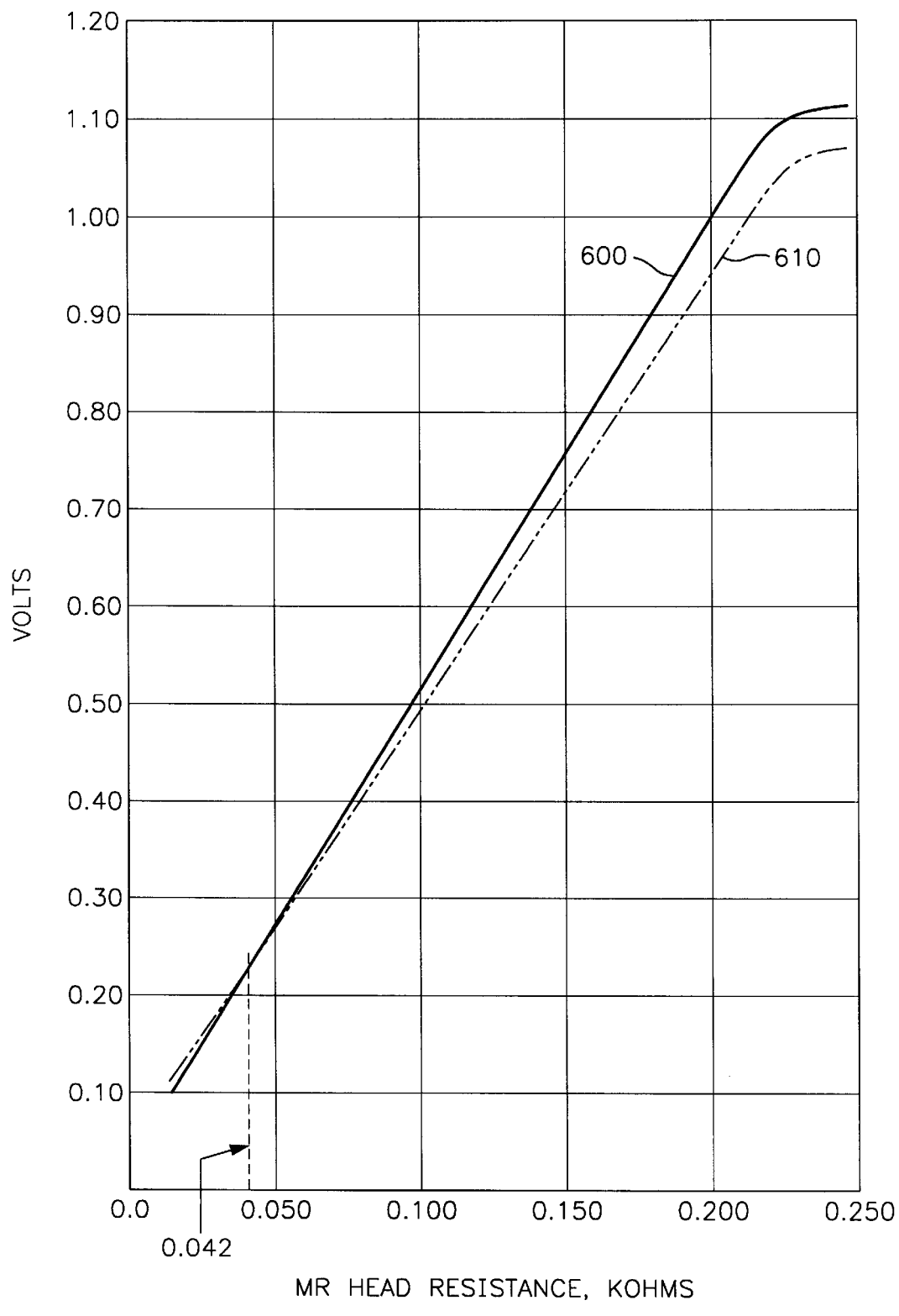
FIG. 6 is a graph showing characteristics of the voltage measurement circuit in one implemented embodiment.

FIG. 6 is a graph that shows the characteristics of the circuit illustrated in FIGS. 3–5, in one implemented embodiment in which the $I_{BIAS}$ is five milliamps, and measurement enable signal has been asserted. The actual voltage across the MR head is depicted by the solid line 600 and the measured voltage across the MR head $V_{MR}$ is shown by dotted line 610. The circuit implemented herein measures voltage across the MR head up to about 1.0 volt, which is equivalent to 200 ohms for the MR head resistance at the 5 milliamp bias current condition.

As shown in FIG. 6 the intersection between the lines 600 and 610 appears at approximately 42 ohms for this particular implementation, at which point the actual and measured MR head voltage is equal. Equation 2 corrects the deviation between the actual head voltage and the measured voltage so there is minimum error for the MR head resistance over an expected range of between, for example, 22–70 ohms.

Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawings.

We claim:

1. A circuit for measuring the voltage across a magnetoresistive (MR) head installed on an actuator arm for a disk drive unit, comprising:
   a control unit for supplying a measurement enable signal; and
   a measurement circuit module situated proximate to said actuator arm, comprising
      a current bias circuit responsive to said control unit for supplying a bias current to the MR head,
      a common node, coupled to the current bias circuit, providing a voltage signal responsive to the voltage across the MR head,
      an amplifier having an input node and an output node, and
      an input switch, responsive to the measurement enable signal, coupled between the input node and the common node.

2. The voltage measuring circuit of claim 1, further comprising:
   an output terminal; and
   an output switch, responsive to the measurement enable signal, coupled between the output node of the amplifier and the output terminal.

3. The voltage measuring circuit of claim 1 further comprising an electrical cable terminating in an electrical connector at one end and connected to said measurement circuit module at the other end, said output terminal electrically connected to a connector pin in said electrical connector.

4. The voltage measuring circuit of claim 1 wherein said measurement circuit module is mounted on said actuator arm.

5. The voltage measuring circuit of claim 1 further comprising a flexible circuit positioned in close proximity to said actuator arm, wherein said measurement circuit module is affixed to said flexible circuit.

6. The voltage measuring circuit of claim 1 further comprising a printed circuit board affixed to said actuator arm, wherein said measurement circuit module is mounted on said printed circuit board.

7. The voltage measuring circuit of claim 1 further comprising a flexible circuit and a semiconductor chip mounted thereon, wherein said measurement circuit module is implemented in said semiconductor chip.

8. The voltage measuring circuit of claim 1 further comprising:
    an input bipolar junction transistor (BJT) having a base, a collector, and an emitter, wherein the base is coupled to the input switch and the emitter is coupled to the MR head so that the first voltage applied to said amplifier includes a first diode drop across the base-emitter junction; and
    wherein said amplifier includes a second bipolar junction transistor having a base coupled to the base of the first BJT, a collector, and an emitter, coupled to an output so that the base-emitter junction supplies a second diode drop that compensates for said first diode drop.

9. The voltage measuring circuit of claim 8 wherein said current bias circuit is coupled to supply a current $I_{BIAS}$ through said first BJT and to supply a control current $I_{CONTROL}$ to said base of said first BJT.

10. The voltage measuring circuit of claim 1 wherein said control unit includes circuitry, responsive to an output voltage $V_{MR}$ from said amplifier, for calculating a resistance of the MR head $R_{MR}$, and determining an optimum bias current.

11. The voltage measuring circuit of claim 10 further comprising means for storing the optimum bias current in the disk drive unit.

12. The voltage measuring circuit of claim 1 further comprising a ground switch coupled between the input node and ground, for grounding said input node responsive to deassertion of said measurement enable signal.

13. The voltage measuring circuit of claim 1 further comprising:
    a mode select input supplied by said control unit having a first state and a second state; and
    wherein said amplifier includes a first resistor and a first mode switch responsive to said first state to provide a first current path, and a second resistor and a second mode switch responsive to said second state to provide a second current path through said amplifier.

14. The voltage measuring circuit of claim 13 wherein said first current path defines the operating point of the amplifier in a first mode, and said second current path defines the operating point of the amplifier in a second mode.

15. A circuit for measuring the voltage across a plurality of magnetoresistive (MR) heads connected to a common node of a multi-port preamplifier, comprising:
    a control unit for supplying a measurement enable signal and a head select signal;
    a circuit module mounted in said disk drive enclosure, comprising
        a current bias circuit coupled to said plurality of MR heads to supply a bias current,
        a head selection means responsive to said head select signal for selecting one of said MR heads and applying said bias current
        a common node coupled to the current bias circuit for providing a first voltage signal responsive to the voltage across said one MR head,
        an amplifier having an input node and an output node,
        an input switch, responsive to the measurement enable signal, coupled between the input node and the common node,
        an output terminal, and
        an output switch, responsive to the measurement enable signal, coupled between the output node and the output terminal.

16. The voltage measuring circuit of claim 15 further comprising an electrical cable terminating in an electrical connector at one end and connected to said circuit module at the other end, said output terminal electrically connected to a connector pin in said electrical connector.

17. The voltage measuring circuit of claim 15 wherein said circuit module is affixed to said actuator arm.

18. The voltage measuring circuit of claim 15 further comprising a flexible circuit positioned in close proximity to said actuator arm, wherein said circuit module is affixed to said flexible circuit.

19. The voltage measuring circuit of claim 15 wherein said circuit module is implemented in a semiconductor chip.

20. The voltage measuring circuit of claim 15 further comprising:
    a switching network coupled to said common node, including a plurality of head select switches responsive to head select signals supplied from said control unit;
    a plurality of input bipolar transistors, each having a gate coupled to one of said head select switches and an output coupled to one of the MR heads so that the first voltage applied to said amplifier includes a first diode drop $V_{BE}$; and
    wherein said amplifier includes a second bipolar transistor having a second diode drop $V_{BE}$ that compensates for said first diode drop.

21. The voltage measuring circuit of claim 20 wherein said current bias circuit is coupled to supply a current $I_{BIAS}$ through said first bipolar transistor and to supply a control current $I_{CONTROL}$ to said gate of said first bipolar transistor.

22. The voltage measuring circuit of claim 15 further comprising:
    a mode select input supplied by said control unit having a first state and a second state;
    wherein said amplifier includes a first resistor and a first mode switch responsive to said first state to provide a first current path, and a second resistor and a second mode switch responsive to said second state to provide a second current path through said amplifier.

23. The voltage measuring circuit of claim 22 wherein said first current path defines the operating point of the amplifier in a first mode, and said second current path defines the operating point of the amplifier in a second mode.

24. The measuring circuit of claim 15 wherein said control unit includes means, responsive to an output voltage $V_{MR}$ from said amplifier, for calculating a resistance of each MR head $R_{MR}$, and determining an optimum bias current for each of said plurality of MR heads.

25. The measuring circuit of claim 24 further comprising means for storing the optimum bias current for each of said plurality of MR heads in the disk drive unit.

26. A method of measuring the resistance of an MR head comprising the steps of:
    a) supplying a predetermined bias current to said MR head;
    b) applying an enable signal to a voltage measurement circuit situated within the disk drive enclosure, thereby coupling the measurement circuit with the voltage across the MR head;
    c) detecting a voltage $V_{MR}$ at the output of said voltage measurement circuit; and
    d) responsive to said voltage $V_{MR}$, calculating a resistance $R_{MR}$ of the MR head.

27. The resistance measuring method of claim 26 further comprising the steps of:

e) responsive to said resistance $R_{MR}$, determining an optimum bias current;

f) storing said optimum bias current with the file information for said MR head; and g) deasserting the enable signal to isolate the voltage measurement circuit from the MR head.

28. The measuring method of claim 27 further comprising the step of operating said disk drive unit and supplying said stored optimized bias current to said MR head.

29. The measuring method of claim 26 wherein each of said steps is performed subsequent to merging the MR head into the disk drive enclosure.

30. The measuring method of claim 26 wherein said steps a) through g) are repeated subsequent to operation of said disk drive unit.

31. The measuring method of claim 26 wherein said disk drive unit comprises a plurality of MR heads, and further comprising the steps of sequentially selecting each MR head and measuring its resistance by repeating each of said steps a) to d).

32. A method of protecting a MR head during manufacture, testing its electro-magnetic characteristics, and after testing isolating the MR head from the measurement circuit, comprising the steps of:

providing a short circuit between the terminals of a MR head to protect the MR head against electro-static discharge;

assembling the MR head with the actuator arm to provide a head stack assembly (HSA);

mounting a voltage measurement proximate to said HSA, said measurement circuit comprising an amplifier having an input node and an output node, and an enabling circuit that includes an input switch coupled between the input node and a common node coupled to said MR head and an output switch coupled between the output node and an output terminal;

removing the short circuit;

applying an enable signal to the enabling circuit, and responsive thereto closing the input switch to couple the common node to the amplifier and closing the output switch to couple the amplifier to the output terminal;

providing a bias current to said MR head;

measuring an output voltage at the output terminal indicative of the voltage across said MR head; and applying a turn-off signal to the switching circuit, and responsive thereto opening the input switch to isolate the common node from the amplifier and opening the output switch to isolate the output of the amplifier from the output terminal.

33. The method of claim 32 wherein the amplifier includes a mode select circuit coupled to the amplifier and the switching circuit, and further comprising the step of:

applying a mode select signal to the mode selection circuit to control an operating point of said amplifier responsive to said mode select signal.

34. A disk drive unit comprising:

a controller unit;

a spindle drive controller coupled to the controller unit;

a plurality of stacked magnetic disks rotatably mounted on a spindle coupled to a spindle motor, said spindle motor electrically coupled to the spindle drive controller;

at least one magnetoresistive (MR) head electrically coupled to the controller unit;

an actuator drive controller coupled to the controller unit;

an actuator shaft rotatably coupled to an actuator motor, said actuator motor coupled to the actuator drive controller; and an actuator assembly coupled to the actuator shaft, comprising
a comb unit having a plurality of actuator arms and a hub assembly coupled to the actuator shaft, and
a plurality of head suspension assemblies each coupled to one of said plurality of actuator arms, each head suspension assembly comprising
an MR head, and an arm electronics unit situated in close proximity to said actuator assembly comprising:
a control unit for supplying a measurement enable signal;

a measurement circuit implemented within said arm electronics unit, comprising
a current bias circuit responsive to said control unit for supplying a bias current to the MR recording head,
a common node, coupled to the current bias circuit, providing a voltage signal responsive to the voltage across the MR head,
an amplifier having an input node and an output node,
an input switch, responsive to the measurement enable signal, coupled between the input node and the common node,
an output terminal, and
an output switch, responsive to the measurement enable signal, coupled between the output node and the output terminal.

35. The disk drive unit of claim 34 wherein said arm electronics unit comprises a flexible circuit and an integrated circuit, and said measurement circuit is implemented in said integrated circuit.

36. The disk drive unit of claim 35 wherein said arm electronics unit comprises a printed circuit board mounted on said actuator assembly and an integrated circuit mounted thereon, and said measurement circuit is implemented in said integrated circuit.

37. The disk drive unit of claim 34 further comprising an electrical cable terminated in a connector having a plurality of terminal pins and coupled to said arm electronics unit, said output terminal coupled to terminal pin in said connector.

* * * * *